United States Patent [19]
Rein

[11] Patent Number: 6,020,826
[45] Date of Patent: Feb. 1, 2000

[54] FINGER RING WITH INFORMATION STORAGE UNIT

[76] Inventor: Claus Rein, Maulbeerallee 5, D-14469 Potsdam, Germany

[21] Appl. No.: 08/849,011

[22] PCT Filed: Nov. 21, 1995

[86] PCT No.: PCT/DE95/01700

§ 371 Date: Dec. 15, 1997

§ 102(e) Date: Dec. 15, 1997

[87] PCT Pub. No.: WO96/17319

PCT Pub. Date: Jun. 6, 1996

[30] Foreign Application Priority Data

Nov. 11, 1994 [DE] Germany .............................. 44 43 253

[51] Int. Cl.[7] ..................................................... G06F 7/04
[52] U.S. Cl. ....................... 340/825.31; 380/23; 235/380; 902/4
[58] Field of Search ......................... 340/825.31; 380/23; 235/380; 902/4

[56] References Cited

U.S. PATENT DOCUMENTS 3,806,874  4/1974  Ehrat ......................................... 235/380

FOREIGN PATENT DOCUMENTS

9320743  3/1995  Germany .

*Primary Examiner*—Michael Horabik
*Assistant Examiner*—Jean B. Jeanglande
*Attorney, Agent, or Firm*—Londa and Traub LLP

[57] ABSTRACT

A finger ring is provided with an information storage unit (21) and at least two electrically conductive, mutually insulated ring elements that serve as contacts(1). To enable quick and reliable mating of the contacts (1) of the ring with corresponding mating contacts (17) of a control device, the ring contacts (1) have tangential planes (2) which slant toward each other, and the ring contacts (1) can be reached unimpeded only from certain zones spatial regions (8, 10) or adjacent subregion segments(14).

22 Claims, 7 Drawing Sheets

FINGER RING WITH INFORMATION STORAGE UNIT

BACKGROUND OF THE INVENTION

The present invention relates to a finger ring with data storage unit.

It is already known to provide finger rings with an electronic data storage unit in order to have available at all times an information storage which is both reliable and easily handled, and constantly supervisable. For an exchange of information with a corresponding control device, it is necessary to transmit the information, for which contactless means, for instance optical means (DE-OS 35 07 381(E 05 B 49/00), DE-OS 42 11 386(G 08 B 25/12)), electromagnetic means (DE-OS 35 07 389(E 05 B 49/00), DE-OS 25 57 637(E 05 B 47/00), DE-AS 25 57 637(E 05 B 49/00), DE-OS 42 11 386(G 08 B 25/12)) as well as magnetic means (DE-OS 35 07 389(E 05 B 49/00)) have been proposed, in addition to electrical contacts (DE-OS 35 07 389(E 05 B 49/00)).

Contactless connections, to be sure, have the advantage of being conveniently handled, but the disadvantage that the information transmitted can be easily picked up by unauthorized persons, for instance by the use of an eavesdropping device which records scattered radiation. Direct electrical contact provides much greater security in this respect; the disadvantage here, however, lies in the necessity of placing the contacts on the finger ring in proper position with respect to the mating contacts on the control device and of assuring simultaneous contact of the corresponding pairs of contacts. DE-OS 25 57 637(E 05 B 47/00) and DE-AS 25 57 637(E 05 B 47/00) describe a finger ring which has a recess on its outer side within which there can be inserted a component which is provided on its surface with two contact surfaces of hard metallic material and within which there is an electronic circuit which contains key information. Detailed descriptions of the two contact surfaces are not given, but it can be noted from FIG. 1 of DE-OS 25 57 637 and DE-AS 25 57 637 that the two contacts form a common plane with the flat surfaces of the aforementioned component part or are arranged only slightly different therefrom. This arrangement has the disadvantage that, in order to obtain good contacting with the mating contacts, a comparatively complicated construction is required. Such a construction is described in connection with FIG. 2 and FIG. 3 of DE-OS 25 57 637 and DE-AS 25 57 637 where the mating contacts are seated elevated on a scanning surface having a shape which corresponds to that of the contact-containing component on the ring and are resiliently mounted. For the making of contact between finger ring and mating contacts, the finger ring must be positioned precisely on or in the scanning surface and possibly pressed therein. This process requires a steady hand, favorable external conditions (light, no vibrations) and possibly time, which is a great disadvantage of such a ring with respect to user-friendly use.

In general, the making of contact is cumbersome from a handling standpoint, and thus no longer very user-friendly, if the finger ring must be brought precisely into a given position in order to produce a suitable connection between contact and mating contact.

Furthermore, other information supports with electrical data transmission have also become known. In U.S. Pat. No. 3,806,874, an identification system is described in which inter alia an identification unit in the form of an arm band is shown. There are two contacts on the outside of the arm band. In order to identify the unit, the arm band is pressed against two V-shaped mating contacts. For this purpose, however, the contacts and mating contacts must be positioned precisely opposite each other, which can be achieved only by a precise approach and a correct untilted position of the wrist. In addition to these disadvantages, there are also disadvantageous demands on the mating contacts in the case of an arm band. Their size must correspond approximately to the diameter of the arm band and they must be arranged clearly free-standing on their fastening base so that they can be readily accessed by the arm, which may possibly be covered by clothing, and that the arm band can be pressed between the V-shape.

Another disadvantage is that this arrangement, which requires a precise positioning of contacts and mating contacts, does not make it possible for the arm band to be pulled over a surface on which the mating contacts are present and to engage between the mating contacts. The access to the contacts is prevented here in two directions, by the arm itself and the clothing. The mating contacts can therefore be reached, unimpeded, by the contacts only from one direction, directly from above and not twisted with respect to each other.

The object of the invention is, in the case of a finger ring with information storage unit and electric contacts for transmission of information and/or energy, without aesthetically impairing its character as jewelry ring, to make possible, by the arrangement of the contacts, on the one hand a rapid and dependable bringing of the contacts of the finger ring against corresponding mating contacts of a control device so as to establish an information and/or energy connection without great technical difficulties of handling and, on the other hand, a sturdy, simple and diversified shape of both the contacts on the finger ring and of the mating contacts on the control device.

Furthermore, other information supports with electrical data transmission have also become known. In U.S. Pat. No. 3,806,874, an identification system is described in which inter alia an identification unit in the form of an arm band is shown. There are two contacts on the outside of the arm band. In order to identify the unit, the arm band is pressed against two V-shaped mating contacts. For this purpose, however, the contacts and mating contacts must be positioned precisely opposite each other, which can be achieved only by a precise approach and a correct untilted position of the wrist. In addition to these disadvantages, there are also disadvantageous demands on the mating contacts in the case of an arm band. Their size must correspond approximately to the diameter of the arm band and they must be arranged clearly free-standing on their fastening base so that they can be readily accessed by the arm, which may possibly be covered by clothing, and that the arm band can be pressed between the V-shape.

Another disadvantage is that this arrangement, which requires a precise positioning of contacts and mating contacts, does not make it possible for the arm band to be pulled over a surface on which the mating contacts are present and to engage between the mating contacts. The access to the contacts is prevented here in two directions, by the arm itself and the clothing. The mating contacts can therefore be reached, unimpeded, by the contacts only from one direction, directly from above and not twisted with respect to each other.

SUMMARY OF THE INVENTION

One essential advantage of the invention is that, the contacts on the finger ring, which can be shaped in simple and sturdy manner and can be reached easily from the outside, permit a dependable contacting, which is not complicated to handle, between the contacts on the ring and the simple, sturdy and differently shapable mating contacts on a control device, in which connection, by "contacting" there is understood the making of an electrical connection by mechanical contact between contacts and mating contacts for the transmission of information and/or energy. Finger ring constructions are provided in which the contacts lie on the surface, are readily accessible from the outside via spaces which are free of ring elements and the finding as well as the setting of the optimal position of the finger ring for a dependable transmission of information and/or energy is determined not only by the movement of the ring-bearing hand but, furthermore, both by the symmetry of the arrangement and also supported from an energy standpoint upon pressing of the contacts in correspondingly shaped mating contact constructions.

The contacts on the finger ring can be located, on sides facing away from each other or, on sides facing each other and they are so arranged with respect to each other that tangent planes can be constructed to them which intersect in a tangent-plane line of intersection, i.e. the tangent planes are oblique to each other. The resting places are, in case of use, the places of the electric contact with the mating contact and are to be understood as points. If the tangent planes are not tangents to points but to one- or two-dimensional regions of the contact surface, then each point within these regions is to be understood separately as resting place of the corresponding contact. The mutual oblique position of the tangent planes at outer edges or at contact surfaces inclined with respect to the parallel plane extending parallel to the tangent-plane line of intersection through both resting places has the advantage that, with a component of force in direction perpendicular to the parallel plane produced by pressing of the finger ring, a dependable mechanical and thus electric contacting is established since components of force in the direction of pressing as well as laterally thereto are produced on the resting places of the finger ring and on the contact places of the mating contact of the control device, in which connection it is assumed that the mating contacts are so constructed that they can take up these forces. This arrangement of the finger-ring contacts with respect to the mating contacts thus differs from pure resting arrangements, in which, as in DE-AS 25 57 637, the force acts on the contacts and mating contacts only in the pressing direction, and possible plug-contact arrangements, such as known from normal plug, socket or plug-socket arrangements where the lateral component of force brings about the reliable mechanical-electrical contacting.

In order to be able to effect contacting between contacts and mating contacts, the resting places must be accessible. Natural limitations on accessibility exist when the finger ring is worn in customary manner on the fingers of the hand itself. With the fist closed or half open, which corresponds to the position of the hand suitable for the contacting of the mating contacts, the finger ring is only accessible in particularly favorable manner from the front side of the fist. For an intended contacting with the mating contacts it is therefore advisable to wear the ring in such a manner that those regions of the contacts which serve as resting places are also located on the front side of the fist. Thus, at the same time, a pronounced directional arrow is defined in the punching direction of the fist or perpendicular to the third phalanx. This directional arrow is at the same time the contact ring center line of view, i.e. precisely opposite a frontal line of view on the finger ring. In ordinary jewelry rings, it is obvious to arrange the contacts in the jewelry part of the finger ring so that the pronounced directional arrow also passes approximately through the center of its jewelry part and direct glance on the jewelry part represents the frontal view. The limit of practical access to the contacts on the finger ring ends approximately at the plane up to which the fist can be brought in punching direction without being impeded. If one presupposes a precisely fitting finger ring and an ideal position of the finger, this plane lies as tangent plane on the parallel third finger members and can, it is true, contact the inner surface of the finger ring but not intersect it. At the same time, this plane is perpendicular to the pronounced directional arrow and it is thus a normal plane with respect to this directional arrow and represents practically a plane of limit of accessibility for the position of possible resting places since, behind it, one is already between the fingers, and therefore in a region which is very unfavorable for contacting from the standpoint of handling. In order to realize contacting with the mating contacts, the finger ring must be able to be brought at least up to the resting places on the mating contacts. The plane which extends parallel to the plane of limit of accessibility through the resting place at the smallest distance from it is therefore of importance of practical limit plane for the action of the contacting and will be referred to below as the limit of action. If the parallel plane extends perpendicular to the contact ring-center direction of viewing, i.e. parallel to the limit plane of accessibility, then the parallel planes and the limit of action are in identical position. If the parallel plane, on the other hand, does not extend parallel to the limit of action then, only the situation in the regions of space on the front side of the contacts up to the resting places, i.e. on the front side of the limit of action are of importance with respect to the contacting function since no contacting is provided for in any event behind the limit of action. In order to achieve a dependable contacting between contacts and mating contacts, a pressing force perpendicular to the parallel plane is necessary, i.e. a corresponding direction of force arrow points in this same direction. From the standpoint of handling, there is particularly advantageous a contacting in which the pronounced directional arrow and the direction of force arrow point in the same direction, i.e. when the contacting is brought about with frontal punching fist. If the pronounced directional arrow and the direction of force arrow do not point in the same direction, then the opposing force upon the pressing of the finger ring against the mating contact does not act in the direction of the center of the ring, as a result of which a lateral moment of force is produced and the finger ring can easily be pressed out of the stable position in which it is worn on the finger.

Completely free, direction-independent access to the contacts in front of the limit of action, to be sure, permits contacting with the mating contacts but by itself, however, does not result in any advantages in order to establish a dependable electrical connection rapidly and in a manner simple to handle. They are obtained only by establishing certain privileged paths and directions. This is obtained by the division of the total space into six individual spaces. The six individual spaces are produced by a cutting of the parallel plane by two normal planes which are perpendicular to it in the resting places and extend parallel to the tangent plane line of intersection. There are of importance, in particular, the inner individual space which is not passed through by the tangent planes and the two outer individual spaces which are present on the other side of the parallel plane. These three individual spaces are referred to as the first individual-space group, within which, with two comparable situations complementary to each other are established. Either in this first individual-space group those parts of the contacts on which the resting places are located are arranged within the inner individual space and the two outer individual spaces are free of ring elements on the front side of the contacts up to the resting places, or, the inner individual space is free of ring elements on the front side of the contacts up to the resting places and the two outer ones contain the regions of the contacts with the resting surfaces. On the front side of the contacts there is thus, in both cases, a preferred access up to the resting places over the ring-element free space regions directed parallel to the tangent plane line of intersection or, viewed in another way, the ring elements in the individual spaces which are also directed parallel to the tangent plane line of intersection and are not free of ring elements act as obstacles, or potential thresholds, which an arrangement of mating contacts which has the same distance apart as the resting places permits simultaneous access to both contacts in privileged manner over the individual space regions free of ring elements and, with due consideration of finite dimensions both of the finger ring and of the mating contacts, possibly splints the path up to the contacting. If the mating contacts are oriented over a given length in a manner parallel to the spaceregions free of ring elements and arranged in complementary manner so that they can reach the contacts in the resting places from the space regions which are free of ring elements, then, in case of a movement of the ring, guided along the surface in which the mating contacts lie, in the direction towards this oriented-complementary mating contact arrangement over its entire length, there is the certainty of striking it. If the user knows the orientation of the mating contacts and holds the finger ring in such a manner that the orientation of the space regions free of ring elements agrees with that of the mating contacts then, in the case of lateral or imprecise punch of the ring to the mating contact, then the probability of effecting a contacting is greater than in the event of a point-precise bringing together of contacts and mating contacts. This advantage is greater the longer this orienting-complementary region is in the case of the mating contacts.

If a finger ring in accordance with the invention is moved over a surface which has an alignment of the contacts with the mating contacts such as just described, and if it is borne in mind that, the resting places are located on places of the surface of the contacts which are oblique to each other and can also be reached over the ring-element-free space regions of the second individual-space group, then, with slight pressure and a rough positioning or rough direction established by the position and movement of the hand, the finger ring will, in the vicinity of the final contacting position, automatically engage into the desired position without a targeted approach being necessary in advance, as, for instance, in the case of plug-type contacts. The space regions which directly adjoin the ring-element-free space regions of the first individual space group, engage into the second individual space group and are delimited by the outer contour of the contacts and parallel to the normal planes and the parallel plane can be very small and need not be precisely established since their primary purpose is to permit a gradient of the potential energy in the event of pressing against the mating contacts. The contacts and mating contacts can then slide with respect to each other into a stable position since, under the influence of the pressing force in the vicinity of the final contacting position, the finger ring moves from a position of higher energy into a gradient of potential energy and, similar to the manner in which a ball rolls into a depression, slides in the direction of minimum energy. As a result of the unstable inherent statics of a two-point support, both contacts are reliably pressed on the mating contacts in the case of the presence of a pressing force. Also in the case of three contacts, for every possible pair of contacts a dependable contacting and maintaining of contact would be possible due to the inherent statics of a three-point support, a dependable contacting and maintenance of contact are still possible. Only as from four contacts do problems arise, at least for rigid contact structures, which either require very precise fitting instructions of contacts and mating contacts or flexible contacts or mating contacts, as a result of which a considerably greater expense is necessary and the sturdiness is more difficult to realize. There is the possibility of arriving from an arrangement described above to a further arrangement since the resting places lie closer together. This case is very suitable for practical use, since in this way extensive contact regions of the finger ring can be used for a possible contacting with the mating contacts of a control device, and it means that, with corresponding construction of the mating contacts, the finger ring can be turned and tilted to a limited extent on the mating contacts while maintaining the electric contact connection between the corresponding contacts of the finger ring and of the mating contacts, as a result of which, once again, the probability of producing a reliable contact is increased even in the event of an inexact position of the finger ring with respect to the mating contacts.

The finger ring of the invention combines, for the making of contact, advantageously a helpful function of assisting in bringing the contacts together with a necessary function, the effecting of the contacting. The making of the contacting, the necessary function, takes place on each contact only on, in each case, one place of the contact surface, the resting place. The rest of the surface serves more or less for the helpful function or, for ease in handling. There results the possibility that at least a part of the helpful function is taken over by ring elements which themselves do not represent contacts but can support the bringing of the finger ring against the last place where contacting takes place. These ring elements can in many cases be understood as a three-dimensional or configurational continuation of the shape of the contact.

It is furthermore advantageous for the contacts to have an elongated shape and to be arranged alongside of each other along their long side. In this way, there is obtained an additional increase in the probability of bringing contacting about when one starts from an imprecise starting position. This increase in probability increases with an increasing length/width ratio of the contacts and is in addition to the advantage already obtained by the arrangement of the mating contacts. Even with two-point mating contacts advantages thus result in the case of lateral approach of the finger ring, i.e. exerted at the height of both points, since there is the certainty of the making of contact over the entire length of the contacts.

With the conditions of construction for the finger ring in accordance with the invention, large-area sturdy arrangements are possible for the mating contacts, possibly combined with lengthening components of other materials, as a result of which the probability of effecting the contacting is increased, even under unfavorable conditions such as limited sight, difficulty in reaching the mating contacts due to poor positioning, etc. Since the exchange of data when using microelectronic components such as, for instance, nonvolatile memories, such as ROM's, EPROM's or EEPROM's, in the information storage unit generally requires only fractions of a second for transmitting a large amount of information, i.e. only a short time in the energy-stable position, good conditions for the intended data transmission are present even upon vibrations.

In general, for the configuration and arrangement of the mating contacts it is sufficient to satisfy the requirement that the contacts on the finger ring must be capable of being reached from the ring-element-free space regions and individual space regions. A lower position of the contact-making region of the mating contacts in the case of contacts facing away from each other on the finger ring or a higher position with contacts facing each other on the finger ring, supports, to be sure, the above-described effect of the energy-supported sliding into the final contacting situation, but is, however, actually necessary only in a few special cases where the tangent planes can be constructed on the finger ring only on outer edges or corners and there is no oblique surface for the development of a lateral component of force. Thus, the possibilities for the shaping of the mating contacts or their integration in existing arrangements of different purpose, such as metallic decorative constructions, housing parts, etc. are very great. The same is true for the contacts on the finger rings where the resting places of the contacts of the finger ring can be both curved and flat surfaces, curved as well as straight edges and points. The contacts themselves can consist of compact bodies and be made sturdy since fully precise fits with mating contacts and fine-membered resilient or similarly sensitive constructions are not necessary. Curved forms are well-suited, for instance spherical caps, oval or cylindrical half shells or hollow forms, as well as polygonal prism-shaped bodies or multi-surface bodies. The contacts can be arranged in the jewelry part of the finger ring; one contact can be the finger ring itself or the contacts, and particularly in the case of wedding rings, can form the finger ring itself. As material for the contacts, it is obvious, in order to assure good electric contact with mating contacts, to use noble-metal alloys which are ordinarily used for jewelry. In addition to this, it is advantageous to make both the contacts and the surrounding ring elements of material which is as hard and abrasion-resistant as possible, for instance steel, tungsten carbide or non-ferrous metal alloys, since less wear thus takes place upon use.

Since insulating material can practical constructions can, in addition to electrical insulation, frequently also have a fastening function for the contacts, organic potting compounds and inorganic ceramic or glass compounds are, in particular, suitable for this. They can, in addition, be colored for aesthetic purposes. In addition, however, mechanical constructions are also possible in which precious stones, minerals, plastics, glass, pearls, mussel shells, horn, wood or ceramics can be used as insulating materials.

Both for aesthetic reasons and in order to improve the wear properties, there may be advantageous, a local surface coating of the finger ring with a sufficiently hard material. Materials such as metal oxides, glass, ceramics, cermets, plastics, nitrides, carbides, silicides, borides or diamonds are suitable. Some of these materials themselves have a metallic color so that spaces filled with insulating materials between the metallic ring and elements can be backed. Whether only the contacts or parts of the contacts, only the insulating region between the contacts or everything can be coated depends also on the electrical properties of the materials. In the case of materials having semi-conductive properties, there is the possibility of complete coating if the distance between the contacts is clearly greater than the thickness of the coating.

In addition to electrical data transmission, a contact-less method is also advantageous if the situation permits or requires this. This possibility can be easily realized in the manner that, in addition to the electric contacts, an optically transparent ring element is used, behind which there is a component for optical information transfer connected with the information storage unit. The starting of the transmission of information can be effected on the one hand by an electric contacting upon the placing of the contacts on the finger ring on the mating contacts or upon simultaneous actuation of a miniature switch in which case the electric contact with the mating contact remains of importance for providing the energy. If the ring furthermore has a source of energy of its own, preferably in the form of a button cell, data transmission to the control device can also be effected remotely by actuation of the microswitch. The contacts can also be used for the transmitters of energy in order to charge the source of energy in the ring. Instead of an optical information transmission element a transmission/reception coil can be used, in similar manner, in which case it must be seen to it that the function of the coil is not impaired by the screening action of metallic ring elements.

The invention is particularly suited for uses and situations in which, on the one hand, a dependable transmission of information is necessary, such as, for instance, upon the transmission of code numbers, person-related data, confidential data, data coupled to the rendering of a performance, and, on the other hand, where convenient handling is to make possible a rapid, dependable and possibly also discrete data transmission, such as, for instance, the operating of alarm, security or closure systems as well as in the case of data in connection with valuables of monetary worth.

DETAILED DESCRIPTION OF THE INVENTION

Figure 1:
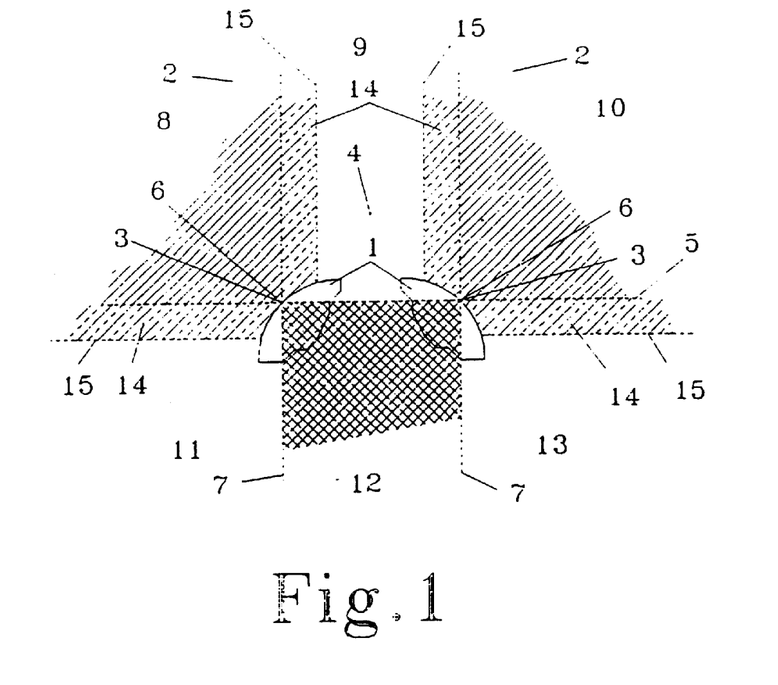
FIG. 1 is a sketch serving to explain the basic principle in the case of resting places on the contacts which face away from each other.
Figure 2:
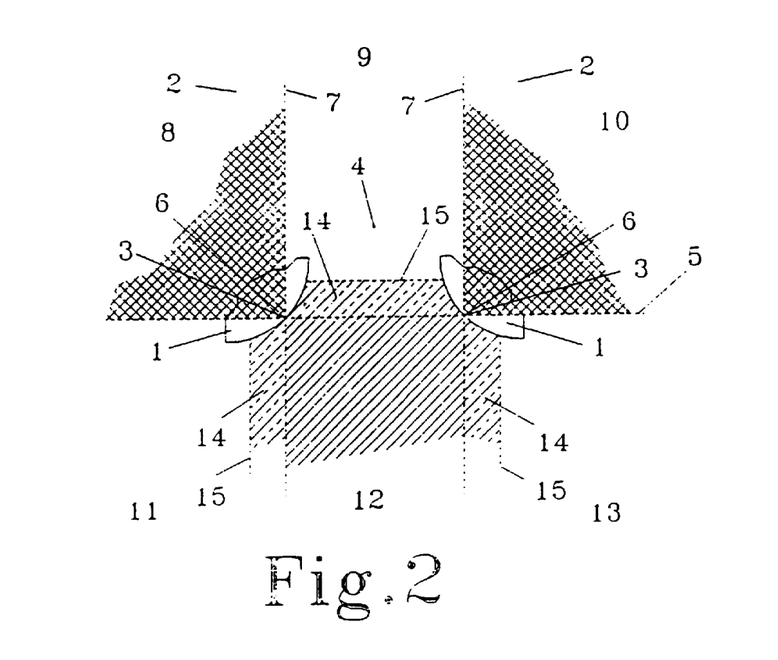
FIG. 2 is a sketch explaining the basic principle in the case of resting places on the contacts which face each other.

FIG. 1 shows in a broken-away view two contacts 1 with two tangent planes 2. The tangent planes 2 contact the contacts 1 in the resting places 3 and intersect in the tangent plane line 4, which in this view is indicated only as a dot. Parallel to the tangent plane line of intersection 4, the parallel plane 5 extends through both resting places 3. In the two resting places 3, the two normal planes 7 are perpendicular to the parallel plane 5. Since they are arranged in parallel to the tangent plane line 4, they form, with the parallel plane 5, the same intersection tangents 6 as the parallel plane 5 does with the tangent planes 2. By the parallel plane 5 and the normal planes 7, the space is divided into six individual spaces 8, 9, 10, 11, 12, 13, two inner 9, 12, and four outer 8, 10, 11, 13, the inner individual space 12 which is not passed through by a tangent plane 2 and the two outer individual spaces 8, 10 present on the other side of the parallel plane forming the first individual-space group. The inner individual space 12 contains the regions of the contacts 1 on which the resting places 3 are located. The two other outer individual spaces 8, 10 of the first individual-space group do not contain any ring elements. In FIG. 2, the occupation of the individual spaces 8, 10, 12 of the first individual-space group is reversed as compared with that of FIG. 1. The regions of the contacts 1 on which the resting places are located are arranged here in the outer individual spaces 8 and 10, and the inner individual space 12 is free of ring elements. The first case in FIG. 1 means that the resting places 3 are on sides of the finger ring facing away from each other, while they face each other in FIG. 2. A first privileging of the paths for the optimal contacting position in the resting places 3 is already realized in the manner that a completely unimpeded access to mating contacts is possible only over the individual spaces which are free of ring elements (single hatching). In all other individual spaces there are ring elements, so that an arrangement of two mating contacts is impeded by them, which possibly can also mean a splinting of the path. In addition, the resting places 3 can also be reached over ring-element-free space regions 14 (alternately single hatching and interrupted hatching) of the second individual space group which directly adjoin the ring-element-free regions of the first individual space group and are delimited by the contour of the contacts 1, both parallel to the parallel plane 5 and to the normal planes 7. The distance of these limitations 15 of the ring-element-free space regions 14 from the parallel plane 5 or the normal planes 7 can be very small but it must be greater than zero in order to provide advantages in the event of inaccurate approach to the final place of contact with the mating contacts.

Figure 3:
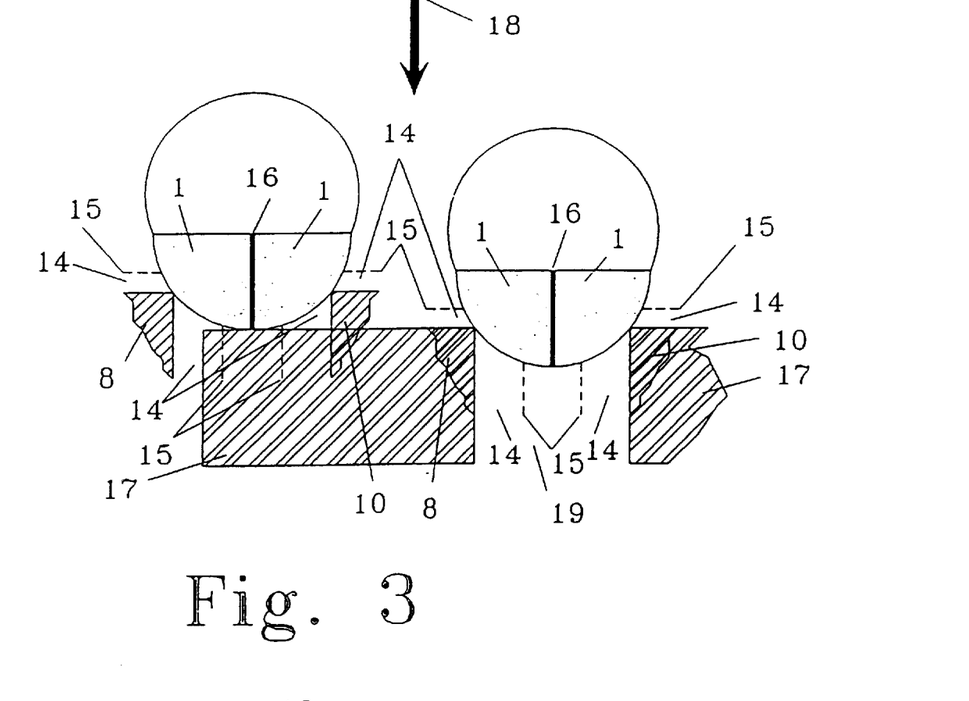
FIG. 3 is a sketch explaining the energy-supported bringing together of contact and mating contact.
Figure 4:
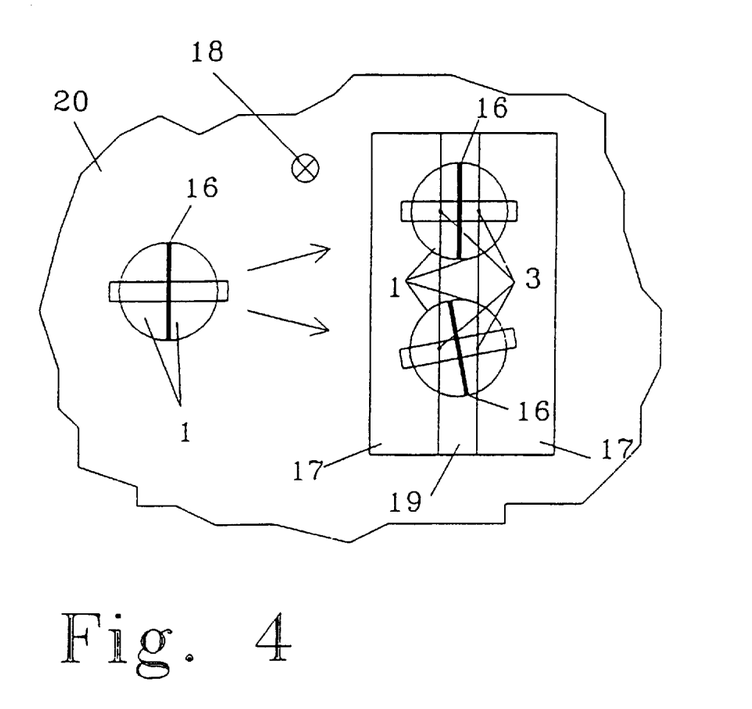
FIG. 4 is a sketch showing the bringing of a finger ring against the mating contacts.

This relationship is indicated in FIG. 3 where the movement of the contacts 1, electrically separated by an insulating material 16, of a diagrammatically shown finger ring along the surface of the mating contacts 17 is shown in shown in two steps—on the surface of a mating contact 17 and between the mating contacts 17. If, upon vertical pressing, represented by the direction of force arrow 18, the finger ring is moved in the direction towards the mating contact gap 19, then, due to the energy gradient which can be realized by the arrangement, the finger ring slides into the energetically most stable position, which at the same time corresponds to the stable contacting position of the mating contacts 17 and the contact 1 in the resting places 3. This sliding as the result of an energy gradient, however, functions only when the ring-element-free space regions 14 are present in the second individual space group. The advantages upon the bringing together of contacts 1 and mating contacts 17 in the direction indicated by the direction-of-force arrow 18 is shown in FIG. 4. Sturdily constructed plate-shaped mating contacts 17 are recessed at the height of a plastic housing 20 (shown in part) of a control device. Upon the moving of the finger ring over the plastic housing 20 in the direction of the mating contacts 17, the entire length of the mating contacts 17 can be used as potential target for contacting. Even in case of merely rough compliance with the direction, as soon as it is attempted to move over the mating contacts 17, the finger ring will engage in the mating-contact gap 19, forming the electric contact between the contacts 1 and the mating contacts 17. Since the potential resting places 3 for the tangent planes lie closely on the surface of the contacts 1, the finger ring can be turned or tilted to a limited extent as compared with the starting position without the contacting between contacts 1 and mating contacts 17 being impaired. Rather than this, an improvement in the bringing together and the reliability of contact between the contacts 1 and the mating contacts 17 is to be noted since more possibilities of evasion for the obtaining of a successful contacting are present in the event of case of uncertainties caused by the situation and handling.

Figure 5:
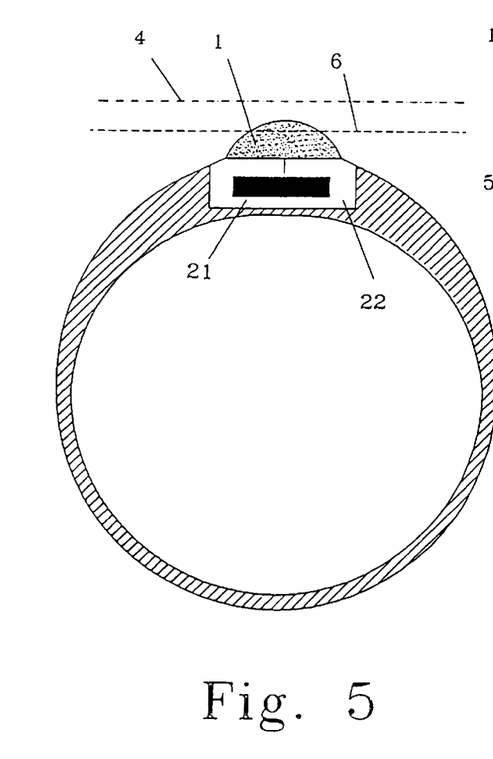
FIG. 5 is a cross section through a finger ring having convex contacts.
Figure 6:
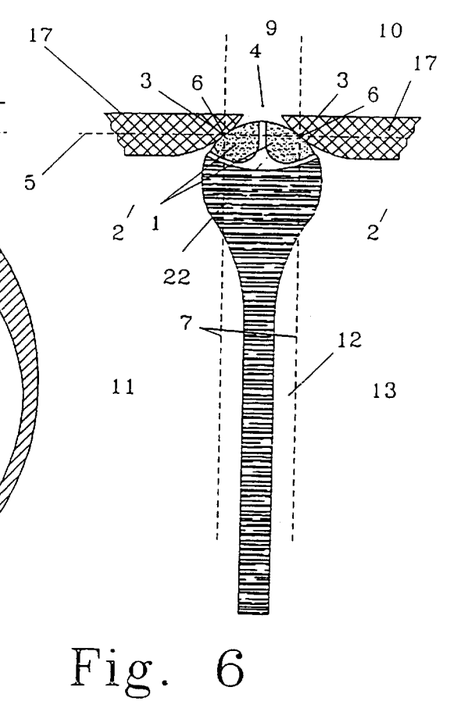
FIG. 6 is a side view of the finger ring of FIG. 5, including a partial sketch of the mating contacts.
Figure 7:
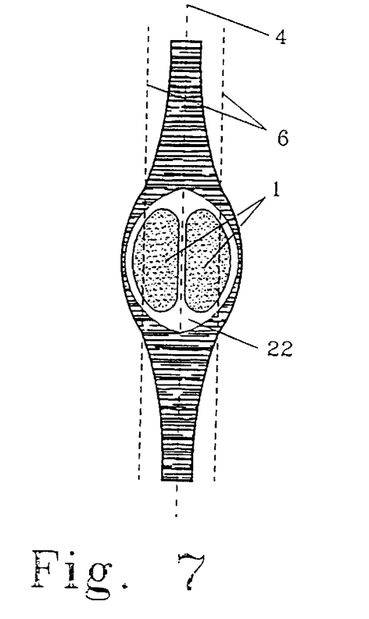
FIG. 7 is a front view of the finger ring of FIG. 5.

A finger ring with information storage unit 21 is shown in section in FIG. 5, in side view, from the direction of the tangent plane line of intersection 4 in FIG. 6, and in front view in FIG. 7. The contacts 1 have a convex surface and the resting places 3 lie on sides facing away from each other. A potting compound 22 serves both for embedding the information storage unit 21 in a recess in the finger ring and also as insulator and for fastening the contacts 1, which are electrically connected to the information storage unit 21. The information storage unit 21 contains a programmable memory and is provided with current for its operation over the contacts 1. The exchange of information in both directions also takes place over the same path.

FIG. 6 shows a division of the space by the parallel plane 5 and the normal planes 7 into the six individual spaces 8, 9, 10, 11, 12, and 13 for this finger ring is shown. The inner individual space 12 which is free of tangent planes contains the regions of the contacts 1 on which the resting places 3 are located, and the outer individual spaces 8 and 10 represent the individual spaces which are entirely free of ring elements. When the finger ring is pulled over the arrangement of the mating contacts 17, the ring will, upon slight pressing, engage in the optimal contacting position as soon as it comes into the curved region of the mating contacts 17. Depending on the position of the hand, and thus of the finger ring, contacting with the mating contacts 17 for the purpose of transmission of information and/or energy can be obtained via different resting places 3.

Figure 8:
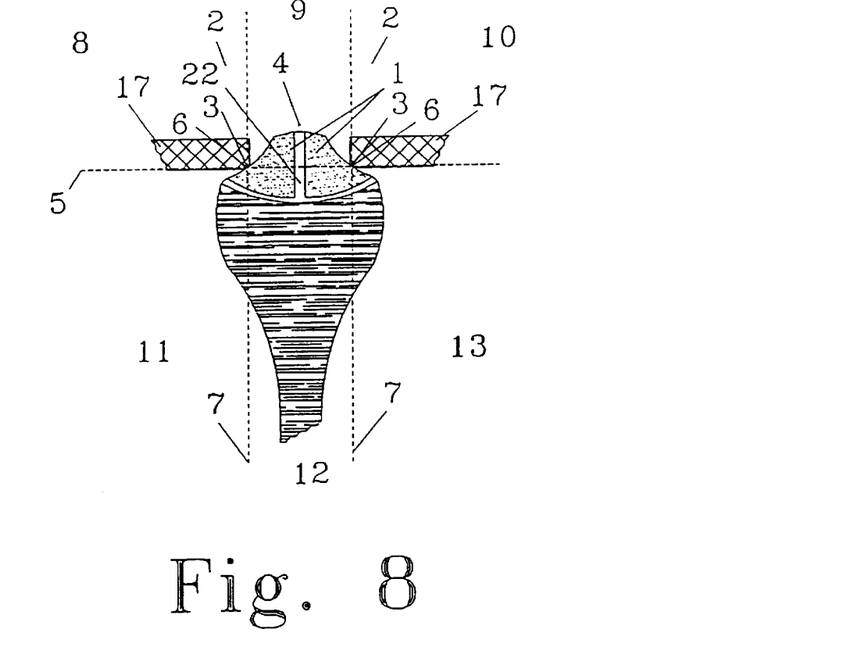
FIG. 8 shows a finger ring with concave contacts in side view, including a partial sketch of the mating contacts.
Figure 9:
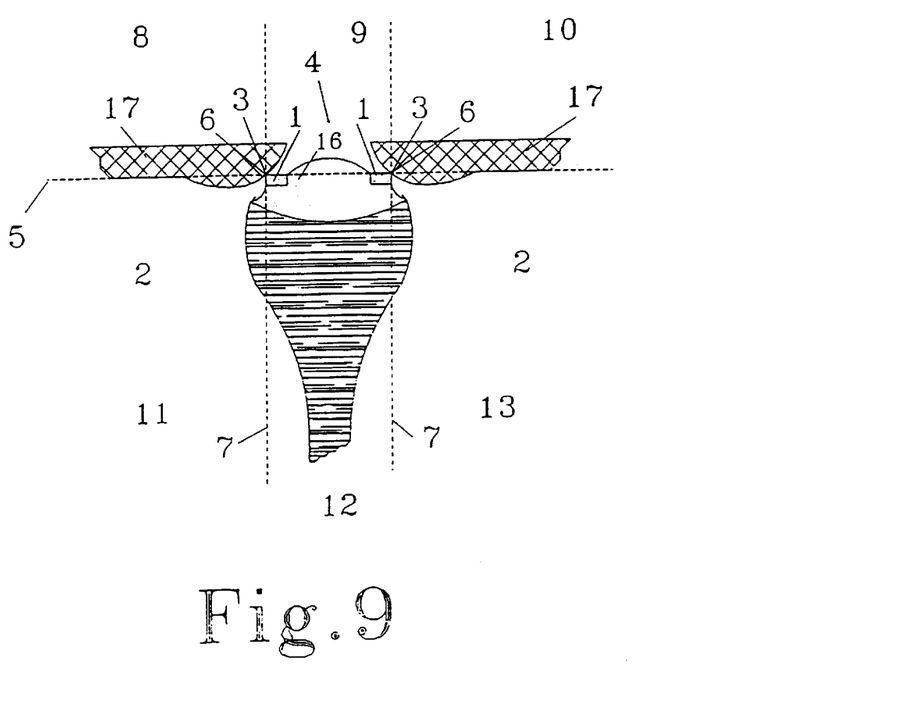
FIG. 9 is a finger ring in side view with edge contacts including a partial sketch of the mating contacts.
Figure 10:
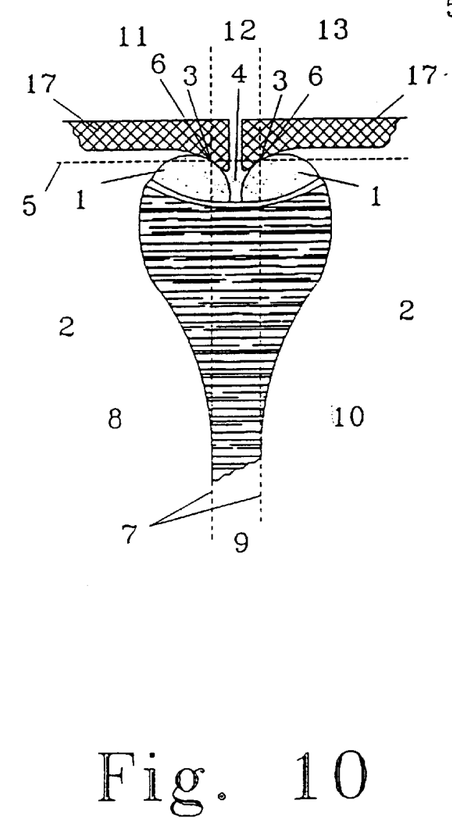
FIG. 10 is a side view of a finger ring with resting places, facing each other, of the tangent planes on convex contacts, including a partial sketch of the mating contacts.

FIGS. 8, 9, and 10 show different variant constructions of contacts 1, such as concave and angular contacts 1 or an arrangement in which the two resting places 3 face each other.

Figure 11:
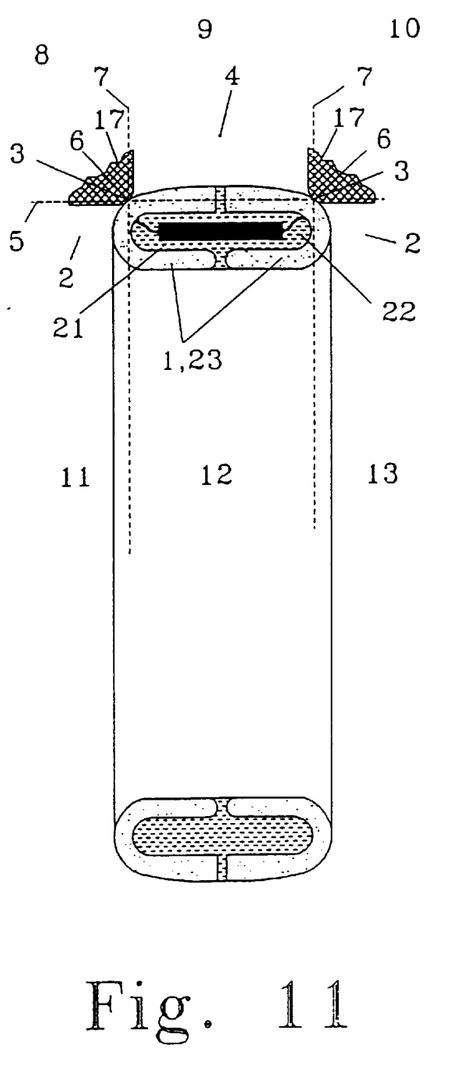
FIG. 11 is a side view in cross section of a wedding ring, in which the contacts themselves form the ring.

FIG. 11 shows a wedding ring which consists of two ring half-shells 23 which are bonded by a potting compound 22 and between which the information storage unit 21 is located, embedded in the potting compound 22. Since this finger ring does not have any jewelry part within which the contacts 1 are arranged but the two ring half-shells 23 forming the finger ring represent the contacts 1, tangent planes 2 can be constructed over the entire circumference.

Figure 12:
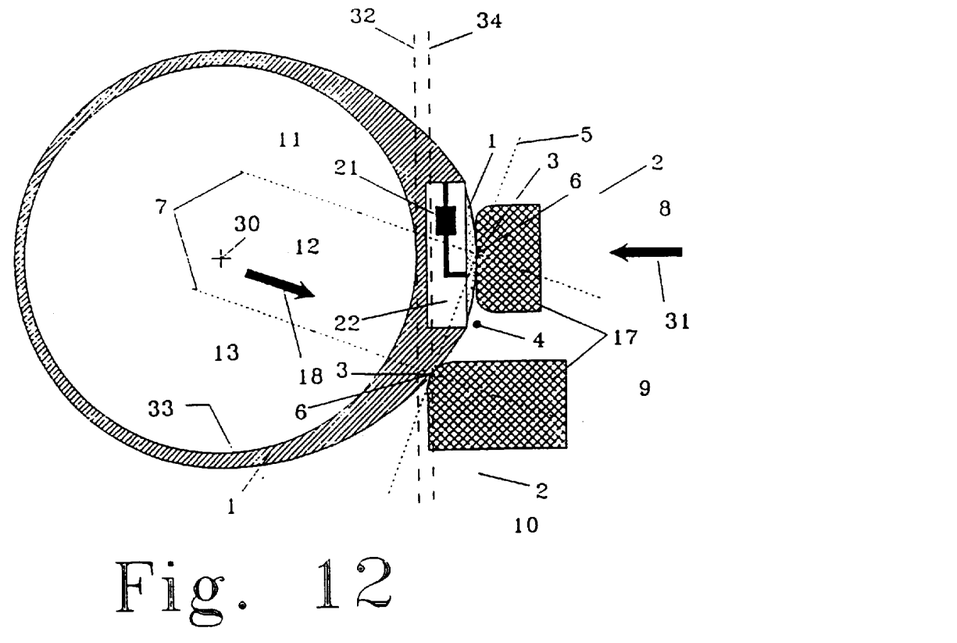
FIG. 12 is a cross section through a finger ring in which the ring itself represents one of the contacts and the direction of force arrow is not directed directly opposite.

In FIGS. 1–11 the parallel plane 5 was identical with the limit of action 34. In FIG. 12 a construction is shown in which the ring part of the finger ring itself represents a contact 1. The direction of force arrow 18 is not directed opposite to the contact 1/ring-center 30 of the line of view 31, i.e. the front view, as in FIGS. 1–11, but is oblique to the front view. If this finger ring were placed on a finger for the purpose of making contact and if it is assumed that it fits precisely, then the finger itself and the contiguous finger arranged parallel to it are behind the access limiting plane 32 which is perpendicular to the front view and contacts the inner surface 33 of the finger ring. All parts of the finger ring lying in front of this access limiting plane 32 can easily be reached and contacted from the front side. However, access is required only up to the resting places 3, i.e. up to the limit of action 34. In the case shown, a region of the outer individual space is behind the limit of action 34 and furthermore is free of ring elements. This fact is, however, unimportant since normally no contacting is intended behind the limit of action 34. As shown, this arrangement is suitable for those cases in which one mating contact 17 is perpendicular and the second mating contact 17 can be reached as shoulder upon a movement from the vertical upper mating contact 17.

Figure 13:
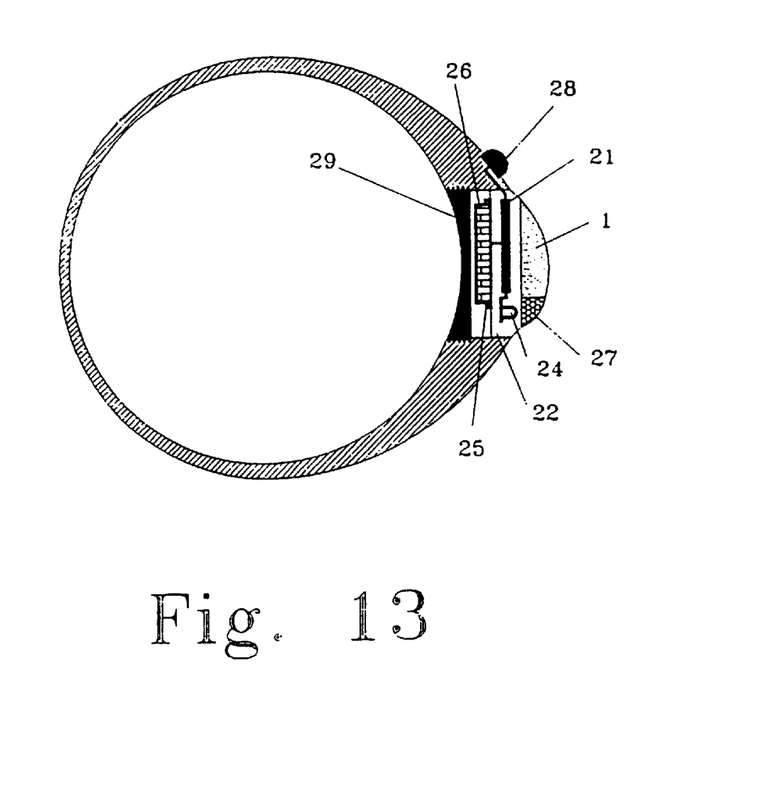
FIG. 13 is a cross section through a finger ring with optical and electrical option of the data transmission, as well as miniature switch.

The possibility of an optical transmission of information is shown with the arrangement in FIG. 13. In an optically transparent potting compound 22, the information storage unit 21, a component for optical transmission of information 24 consisting of a light-emitting diode and a photo diode, and a mount 25 for a button cell are embedded. On the potting compound 22 there are bonded two contacts 1 for transmission of current and possibly of information and, as optically transparent ring element, a ruby. Furthermore, in the solid part of the finger ring there is a miniature switch 28 which can be used for the manual commencement of the optical transmission of information. The two contacts 1 serve for the transmission of energy, for the charging of the button cell 26, and for the transmission of information. The button cell 26 can be replaced since the inside of the finger ring is accessible via the screw closure 29.

Figure 14:
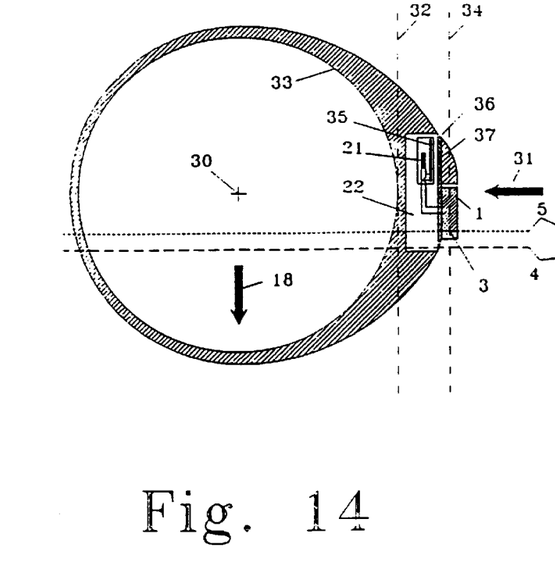
FIG. 14 is a cross section through a finger ring with electromagnetic and electrical option of the data transmission, in which the direction of force arrow extends perpendicular to the front view.
Figure 15:
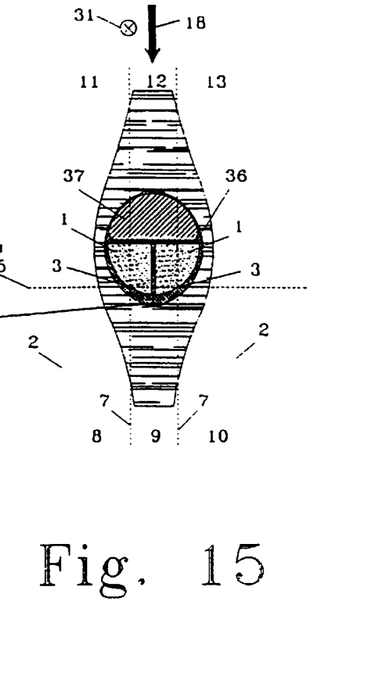
FIG. 15 is a front view of the finger ring of FIG. 14.
Figure 16:
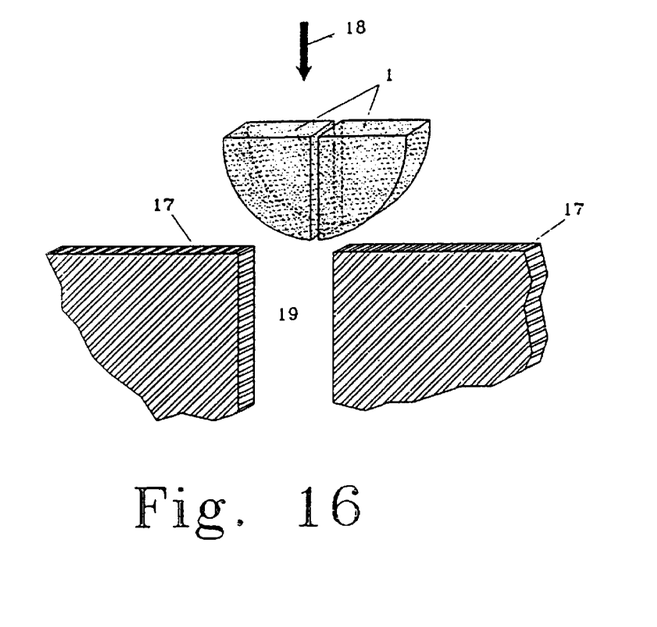
FIG. 16 shows the contacts of the finger ring of FIGS. 14 and 15, with a partial sketch of the mating contacts.

Instead of optically, information can be sent or received without contact also electromagnetically by means of a coil. In FIG. 14, there is shown, in side view, a finger ring the information storage unit 21 of which is connected both to a transmission/reception coil 35 and to the contacts 1. The transmission/reception coil 35 is arranged directly behind an electrically non-conductive base 36 on which, directly in front of the transmission/reception coil there are an electrically non-conductive jewelry element 37 and, below it, the contacts 1. The energy for the operating of the information storage unit 21 and the information transmission/reception process can also be received from the outside via the transmission/reception coil 35. Both the electrically non-conductive base 36 and the jewelry element 37 must be transparent for the wavelength range within which electromagnetic waves are received or sent by the transmission/reception coil 35. Conventional non-conductors such as plastics and ceramics are suitable, as well as glass, amber or precious stones. In contradistinction to FIGS. 1 to 13, in this case the tangent plane line of intersection 4 for the contacts 1 extends in the direction of the line of sight 31 of the front view and both the parallel plane 5 and the normal planes 7 and all individual spaces 8, 9, 10, 11, 12 and 13 are intersected perpendicularly by the access limiting plane 32 and the limit of action 34. FIG. 15 is a front view of the finger ring of FIG. 14, and FIG. 16 shows, without the rest of the finger ring, exclusively the contacts 1 in front of the mating contacts 17. Possible positions of resting places 3 and of the limit of action 34 would be imaginable up to directly in front of the electrically non-conductive base 36. Behind the limit of action 34 there are ring elements in all individual spaces 8, 10, 12 of the first individual space group. On the other hand, in front of the limit of action 34 there are no ring elements in the two outer individual spaces 8, 10 of the first individual space group and thus the contacts 1 are accessible freely from the front up to the resting places 3. If the contacts 1 are brought in the position show in FIG. 16, over the horizontal surface of the mating contacts 17, they engage in the mating-contact gap 19 and contact is made. A combination of the electrical and contact-less data transmission operating with a coil is suitable for those cases in which different control devices are used and the contact-less variant cannot be used because of possibly excessive energy requirements in certain control devices.

List of Reference Numerals

1 Contacts
2 Tangent planes
3 Resting places
4 Tangent plane line of intersection
5 Parallel plane
6 Intersection tangent
7 Normal plane
8 Outer individual space
9 Inner individual space
10 Outer individual space
11 Outer individual space
12 Inner individual space
13 Outer individual space
14 Ring element-free space regions
15 Limitations
16 Insulating material
17 Mating contacts
18 Direction of force arrow
19 Mating contact gap
20 Plastic housing
21 Information storage unit
22 Potting compound
23 Ring half-shell
24 Component for optical information transmission
25 Mount
26 Button cell
27 Optically transparent ring element
28 Miniature switch
29 Screw closure
30 Ring center
31 Contact/ring center line of sight
32 Access limiting plane
33 Inner surface
34 Limit of action
35 Transmission/reception coil
36 Electrically non-conductive base
37 Electrically non-conductive jewel element

I claim:
1. An identification system comprising a finger ring for use in combination with a control device, said finger ring:
  having a center (30) and comprising a data storage unit (21) and at least two electrical contact elements (1) connected with the data storage unit (21) and disposed so as to be insulated from each other and to serve for data and/or energy transmission between the finger ring and the control device, and a frontal view of the finger ring being defined
  wherein, with the viewing direction (31) oriented with respect to the control device in any direction within a pre-selected spatial angular range:

the electrical contact elements (1) are disposed such that resting places (3) on the contact elements (1) make contact with mating contacts (17) on the control device, with tangent planes (2) to the electrical contact elements (1) at the resting places (3) intersecting each other in a line of intersection (4);

a parallel plane (5) is defined, passing through the two resting places (3) and disposed parallel to the line of intersection (4);

normal planes (7) are defined, each passing through one of the resting places (3) and disposed parallel to the line of intersection (4) and perpendicular to the parallel plane (5);

six spatial regions (8–13) are delimited by the parallel plane (5) and the normal planes (7), namely two inner regions (9, 12) and four outer regions (8, 10, 11, 13), with the two inner regions (9, 12) lying between the normal planes (7);

first and second groups of spatial regions are defined, with each of the groups consisting of two outer regions (8 and 10, 11 and 13) on one side of the parallel plane (5) and an inner region (12, 9) correspondingly opposite with respect to the parallel plane (5);

the line of intersection (4) traverses the inner spatial region (9) of the second group;

the inner spatial region (12) of the first group includes areas of the contact elements (1) at which the resting places (3) are in contact with the respective tangent planes (2);

up to the resting places (3), first subregions of the outer regions (8, 10) of the first group of spatial regions which lie in front of the contacts (1) do not include a ring element; and second subregions (14) which are adjacent to the first subregions, which extend into the second group of spatial regions, and which are delimited by an outer contour of the contacts (1) and parallel to the normal planes (7) and the parallel plane (5) do not include a ring element.

2. A finger ring according to claim 1, wherein places for possible resting places (3) lie directly alongside of each other.

3. A finger ring according to claim 2, wherein the contacts (1) have an elongated shape and the contacts (1) are arranged and aligned with respect to each other along their longer side.

4. A finger ring according to claim 1, wherein the finger ring itself consists of at least two ring elements which are developed as ring half-shells (23) and are connected electrically insulated from each other with the information storage unit (21) and thus represent contacts (1).

5. A finger ring according to claim 1, wherein the finger ring is coated locally on its surface by a sufficiently hard insulating material, such as metal oxides, glass, ceramics, cermet, plastic, nitride, carbide, silicide, boride or diamond.

6. A finger ring according to claim 1, wherein on the finger ring, in addition to the two electric contacts (1) there is arranged an optically transparent ring element (27) behind which there is a component for the optical transmission (24) which is electrically connected with the information storage unit (21).

7. A finger ring according to claim 1, wherein a miniature switch (28) is arranged on the finger ring.

8. A finger ring according to claim 1, wherein a transmission/reception coil (35) for electromagnetic waves which is electrically connected to the information storage unit (21) is arranged in the finger ring.

9. A finger ring according to claim 1, wherein on the finger ring there is a source of energy, which is connected electrically to at least two ring elements acting as electric contacts (1).

10. A system according to claim 9, wherein the source of energy comprises a button cell (26).

11. An identification system comprising a finger ring for use in combination with a control device, said finger ring:

having a center (30) and comprising a data storage unit (21) and at least two electrical contact elements (1) connected with the data storage unit (21) and disposed so as to be insulated from each other and to serve for data and/or energy transmission between the finger ring and the control device, and a frontal view of the finger ring being defined by a viewing direction (31) from the contacts (1) towards the center (30) of the finger ring, wherein, with the viewing direction (31) oriented with respect to the control device in any direction within a preselected spatial angular range:

the electrical contact elements (1) are disposed such that resting places (3) on the contact elements (1) make contact with mating contacts (17) on the control device, with tangent planes (2) to the electrical contact elements (1) at the resting places (3) intersecting each other in a line of intersection (4);

a parallel plane (5) is defined, passing through the two resting places (3) and disposed parallel to the line of intersection (4);

normal planes (7) are defined, each passing through one of the resting places (3) and disposed parallel to the line of intersection (4) and perpendicular to the parallel plane (5);

six spatial regions (8–13) are delimited by the parallel plane (5) and the normal planes (7), namely two inner regions (9, 12) and four outer regions (8, 10, 11, 13), with the two inner regions (9, 12) lying between the normal planes (7);

first and second groups of spatial regions are defined, with each of the groups consisting of two outer regions (8 and 10, 11 and 13) on one side of the parallel plane (5) and an inner region (12, 9) correspondingly opposite with respect to the parallel plane (5); inner spatial region the line of intersection (4) traverses the (9) of the second group;

the two outer regions (8, 10) of the first group includes areas of the contact elements (1) at which the resting places (3) are in contact with the respective tangent planes (2);

up to the resting places (3), a first subregion of the inner region (12) of the first group of spatial regions which lies in front of the contacts (1) does not include a ring element; and second subregions (14) which are adjacent to the first subregion, which extend into the second group of spatial regions, and which are delimited by an outer contour of the contacts (1) and parallel to the normal planes (7) and the parallel plane (5) do not include a ring element.

12. A finger ring according to claim 11, wherein places for possible resting places (3) lie directly alongside of each other.

13. A finger ring according to claim 11, wherein the contacts (1) have an elongated shape and the contacts (1) are arranged and aligned with respect to each other along their longer side.

14. A finger ring according to claim 11, wherein the finger ring itself consists of at least two ring elements which are developed as ring half-shells (23) and are connected electrically insulated from each other with the information storage unit (21) and thus represent contacts (1).

15. A finger ring according to claim 11, wherein the finger ring is coated locally on its surface by a sufficiently hard insulating material, such as metal oxides, glass, ceramics, cermet, plastic, nitride, carbide, silicide, boride or diamond.

16. A finger ring according to claim 11, wherein on the finger ring, in addition to the two electric contacts (1) there is arranged an optically transparent ring element (27) behind which there is a component for the optical transmission (24) which is electrically connected with the information storage unit (21).

17. A finger ring according to claim 11, wherein a miniature switch (28) is arranged on the finger ring.

18. A finger ring according to claim 11, wherein on the finger ring there is a source of energy, which is connected electrically to at least two ring elements acting as electric contacts (1).

19. A finger ring according to claim 11, wherein a transmission/reception coil (35) for electromagnetic waves which is electrically connected to the information storage unit (21) is arranged in the finger ring.

20. A system according to claim 19, wherein the source of energy comprises a button cell (26).

21. An identification system comprising a finger ring in combination with a control device, said finger ring having a center (30) and comprising a data storage unit (21) and at least two electrical contact elements (1) connected with the data storage unit (21) and disposed so as to be insulated from each other and to serve for data and/or energy transmission between the finger ring and the control device, and a frontal view of the finger ring being defined by a viewing direction (31) from the contacts (1) towards the center (30) of the finger ring, wherein, with the viewing direction (31) oriented with respect to the control device in any direction within a pre-selected spatial angular range:

the electrical contact elements (1) are disposed such that resting places (3) on the contact elements (1) make contact with mating contacts (17) on the control device, with tangent planes (2) to the electrical contact elements (1) at the resting places (3) intersecting each other in a line of intersection (4);

a parallel plane (5) is defined, passing through the two resting places (3) and disposed parallel to the line of intersection (4);

normal planes (7) are defined, each passing through one of the resting places (3) and disposed parallel to the line of intersection (4) and perpendicular to the parallel plane (5);

six spatial regions (8–13) are delimited by the parallel plane (5) and the normal planes (7), namely two inner regions (9, 12) and four outer regions (8, 10, 11, 13), with the two inner regions (9, 12) lying between the normal planes (7);

first and second groups of spatial regions are defined, with each of the groups consisting of two outer regions (8 and 10, 11 and 13) on one side of the parallel plane (5) and an inner region (12, 9) correspondingly opposite with respect to the parallel plane (5);

the line of intersection (4) traverses the inner spatial region (9) of the second group;

the inner spatial region (12) of the first group includes areas of the contact elements (1) at which the resting places (3) are in contact with the respective tangent planes (2);

up to the resting places (3), first subregions of the outer regions (8, 10) of the first group of spatial regions which lie in front of the contacts (1) do not include a ring element; and second subregions (14) which are adjacent to the first subregions, which extend into the second group of spatial regions, and which are delimited by an outer contour of the contacts (1) and parallel to the normal planes (7) and the parallel plane (5) do not include a ring element.

22. An identification system comprising a finger ring in combination with a control device, said finger ring having a center (30) and comprising a data storage unit (21) and at least two electrical contact elements (1) connected with the data storage unit (21) and disposed so as to be insulated from each other and to serve for data and/or energy transmission between the finger ring and the control device, and a frontal view of the finger ring being defined by a viewing direction (31) from the contacts (1) towards the center (30) of the finger ring, wherein, with the viewing direction (31) oriented with respect to the control device in any direction within a preselected spatial angular range:

the electrical contact elements (1) are disposed such that resting places (3) on the contact elements (1) make contact with mating contacts (17) on the control device, with tangent planes (2) to the electrical contact elements (1) at the resting places (3) intersecting each other in a line of intersection (4);

a parallel plane (5) is defined, passing through the two resting places (3) and disposed parallel to the line of intersection (4);

normal planes (7) are defined, each passing through one of the resting places (3) and disposed parallel to the line of intersection (4) and perpendicular to the parallel plane (5);

six spatial regions (8–13) are delimited by the parallel plane (5) and the normal planes (7), namely two inner regions (9, 12) and four outer regions (8, 10, 11, 13), with the two inner regions (9, 12) lying between the normal planes (7);

first and second groups of spatial regions are defined, with each of the groups consisting of two outer regions (8 and 10, 11 and 13) on one side of the parallel plane (5) and an inner region (12, 9) correspondingly opposite with respect to the parallel plane (5); inner spatial region the line of intersection (4) traverses the (9) of the second group;

the two outer regions (8, 10) of the first group includes areas of the contact elements (1) at which the resting places (3) are in contact with the respective tangent planes (2);

up to the resting places (3), a first subregion of the inner region (12) of the first group of spatial regions which lies in front of the contacts (1) does not include a ring element; and second subregions (14) which are adjacent to the first subregion, which extend into the second group of spatial regions, and which are delimited by an outer contour of the contacts (1) and parallel to the normal planes (7) and the parallel plane (5) do not include a ring element.

* * * * *